US007672827B1

(12) United States Patent
Schapira et al.

(10) Patent No.: US 7,672,827 B1
(45) Date of Patent: Mar. 2, 2010

(54) METHOD AND SYSTEM FOR SIMULATION OF ANALOG/DIGITAL INTERFACES WITH ANALOG TRI-STATE IOPUTS

(75) Inventors: Alexander D. Schapira, Montclair, NJ (US); Asha Chandra, Berkeley Heights, NJ (US); Jonathan A. Eiseman, Springfield, NJ (US)

(73) Assignee: Cadence Design Systems, Inc., San Jose, CA (US)

( * ) Notice: Subject to any disclaimer, the term of this patent is extended or adjusted under 35 U.S.C. 154(b) by 2328 days.

(21) Appl. No.: 09/648,540

(22) Filed: Aug. 28, 2000

(51) Int. Cl.
G06F 17/50 (2006.01)
(52) U.S. Cl. ...................................................... 703/14
(58) Field of Classification Search ......... 341/126–129, 341/144, 155; 703/14, 13; 716/1
See application file for complete search history.

(56) References Cited

U.S. PATENT DOCUMENTS

| | | | | |
|---|---|---|---|---|
| 4,092,639 A | * | 5/1978 | Schoeff | 341/154 |
| 4,618,851 A | * | 10/1986 | Watanabe | 341/139 |
| 5,036,473 A | * | 7/1991 | Butts et al. | 703/23 |
| 5,335,191 A | | 8/1994 | Kundert et al. | 364/578 |
| 5,634,115 A | | 5/1997 | Fitzpatrick et al. | 395/500 |
| 5,812,431 A | | 9/1998 | Kundert | 364/578 |
| 5,859,785 A | | 1/1999 | Kundert | 364/578 |
| 5,949,992 A | | 9/1999 | Kundert | 395/500.35 |
| 6,090,149 A | * | 7/2000 | Nair et al. | 703/14 |
| 6,100,830 A | * | 8/2000 | Dedic | 341/136 |
| 6,560,757 B1 | * | 5/2003 | Ballam | 716/5 |

OTHER PUBLICATIONS

Thelen et al., "Simulating Mixed Analog-Digital Circuits on a Digital Simulator", IEEE, 1988.*
IEE Proceedings, vol. 136, PT. G, No. 3, Jun. 1989.*
Shi et al., "Use of VHDL to Model and Simulate Analog-Digital IC's", IEEE, 1992.*
Minoura et al., "Structural Active Object Systems for Simulation", ACM, 1993.*
Chamberlain, "Parallel Logic Simulation of VLSI Systems", ACM, 1995.*
Low et al., "Cadence-based simulation of floating-gate circuits using the EKV model", IEEE, 1999.*
Yuan et al., "Floating-point analog-to-digital converter", IEEE, 1999.*
Goody, Roy W.; "MicroSim PSpice for Windows", second edition, 1998, Prentice Hall.*
David Overhauser et al., "Evaluating Mixed-Signal Simulators", 1995, IEEE 1995 Custom Integrated Circuits Conference, pp. 113-120.*

* cited by examiner

*Primary Examiner*—Paul L Rodriguez
*Assistant Examiner*—Russ Guill
(74) *Attorney, Agent, or Firm*—Vista IP Law Group, LLP (57) ABSTRACT

A system and method for simulating the electrical operation of a mixed analog/digital system includes the capability for analog circuit block inputs to respond to the condition in which digital gate outputs connected to the analog circuit block input are presented in high-impedance or floating signal states, thereby providing for simulation of a wide variety of mixed analog/digital designs in which this condition occurs. In a simulated design, an analog input of one or more analog circuit blocks is transformed into an analog tri-statable input-output referred to as an ioput. The ioput is capable of driving an analog signal when the digital gate outputs connected to the analog block input are presented in a high-impedance Z state; otherwise, the ioput acts as an analog input to the analog circuit block.

20 Claims, 4 Drawing Sheets

METHOD AND SYSTEM FOR SIMULATION OF ANALOG/DIGITAL INTERFACES WITH ANALOG TRI-STATE IOPUTS

FIELD OF THE INVENTION

The field of the present invention relates to systems and methods useful for simulation of electrical circuits, and, more particularly, to systems and methods for simulating the operation of systems of mixed analog and digital electrical circuits.

BACKGROUND OF THE INVENTION

Simulating the electrical operating characteristics of an electrical circuit design has proven useful in the development of electrical systems and products. Design issues identified by circuit simulation can be corrected prior to the production of actual working prototypes (e.g., breadboard or integrated circuit (IC) implementations), greatly reducing redesign cycle time and costs and, thereby, leading to shortened product development cycles.

Electrical circuit simulation is typically a computation-intensive task, generally requiring the use of a computer having significant processing power and memory resources. To simulate an electrical circuit design, the design is logically constituted in computer memory from stored circuit data according to programmed instructions. Behavioral characteristics of the simulated design are the result of, among other things, the components used in the design, the arrangement of their interconnections, their operating characteristics, and their logic state specifications. A designer evaluates the operation of the electrical circuit design by observing its characteristic response in simulation. The simulated response is obtained by observing signal or waveform characteristics present at particular nodes of the circuit (e.g., test points) or at particular points in the simulation program (e.g. simulation test points or breakpoints). A simulator is said to "solve" for a particular portion of a simulated circuit, also referred to as a circuit block, by calculating the output signal characteristics produced by that circuit block in response to one or more particular input signals.

The design of electrical systems that include both analog and digital circuits or circuit blocks, known as mixed analog/digital systems, is particularly complex. A designer of this class of electrical systems is confronted not only by the design issues present for analog and digital systems individually, but is also faced with issues that arise from the inclusion of both analog and digital circuits in the same system. Mixed analog/digital system design issues are especially prevalent when the mixed design is to be implemented using a single component such as a single IC device (for example, electromagnetic coupling of high frequency switching transients from digital devices to analog circuitry).

In digital logic simulation, logic signals can take the values of 0, 1, X, and Z. The meanings of 0 and 1 comport with the standard definition of a Boolean value (i.e., a binary digit). However, a signal can also take the value "X" if the logic is such that the signal state is unknown or immaterial to the logic specification; i.e., the signal value is either 0 or 1, but the simulator cannot determine which state is present.

The value "Z," however, does not represent a state of either 0 or 1. The value "Z" is not a signal value per se; rather, "Z" represents the state of a signal not being driven or floating. When not actively driving a signal, an electronic device, such as a logic gate or other digital circuit, may present a high-impedance state, or "Z" state, at its output. This high-impedance state is useful for electrically isolating the digital circuit from the effects of other electrical signals connected to its output when that circuit or device is not driving a signal. The truth table logic specification for a digital gate frequently includes entries corresponding to values of "X" and "Z" as well as 0 and 1.

Difficulty may be experienced, however, in attempting to simulate the effect of a Z-value output on a network node and the circuit components or blocks relying upon the network node as a potential input. Because a Z-value represents high impedance or effective isolation of the digital circuit block that normally acts as a driver of the signal at the node, the node signal characteristics may remain undefined. This causes a problem for circuit components or blocks that rely upon the node as an input, and may lead to inaccurate simulation results.

Accordingly, it would be advantageous to provide a simulation system and method which is capable of handling Z-value outputs which connect to other circuit components or blocks, particularly in the context of mixed digital and analog circuit designs.

SUMMARY OF THE INVENTION

The present invention is directed in certain aspects to systems and methods for simulating the electrical operation of a mixed analog/digital system. In an embodiment, a simulator is provided having the capability for a simulated analog circuit block to produce the analog signal value present at the input of the analog circuit block in an actual circuit implementation for the condition in which digital gate outputs connected to the analog circuit block input are in a high-impedance state. This capability allows a mixed analog/digital simulator to simulate a wide variety of mixed analog/digital designs.

A simulator according to this embodiment may be programmed to transform an analog input of one or more analog circuit blocks of an electrical design being simulated into an analog tri-statable "ioput." The ioput generally comprises, for simulator purposes, an input signal line and an output signal line connected to the same node of the analog circuit block. The output signal line of the ioput is capable of driving an analog signal when the digital gate outputs connected to the analog block input are presented during a simulation in a high-impedance Z state. Otherwise, the output signal line has no effect.

In certain embodiments, when an analog circuit block (of a simulated design) receives a tri-state (i.e., Z-value) on one of its inputs, the simulator enables the analog circuit block to solve for the signal produced at the input by the analog circuit block as if that signal were an output of the analog circuit block instead of an input. This output signal value of the analog block is propagated to the other fanouts attached to the analog block input. An input to an analog block thereby becomes an output when not being driven by a digital gate output, but remains an input otherwise.

Further embodiments, variations, modifications, and advantages of the present invention are also disclosed herein.

DETAILED DESCRIPTION OF PREFERRED EMBODIMENTS

Systems and methods are disclosed for simulation of digital and analog circuit blocks which form part of a computer file representing an electronic circuit design, as may be generated using electronic design automation (EDA) software tools.

By way of general background, integrated circuit (IC, or chip) designers often use electronic design automation (EDA) software tools to assist in the design process, and to allow simulation of a chip design prior to prototyping or production. Chip design using EDA software tools generally involves an iterative process whereby the chip design is gradually perfected. Typically, the chip designer builds up a circuit by inputting information at a computer workstation generally having high quality graphics capability so as to display portions of the circuit design as needed. A top-down design methodology is commonly employed using hardware description languages (HDLs), such as Verilog® or VHDL, for example, by which the designer creates an integrated circuit by hierarchically defining functional components of the circuit, and then decomposing each component into smaller and smaller components.

For example, the software-based Accelerated Transistor-level Simulator™ (ATS™) product, commercially available from Cadence Design Systems, Inc. of San Jose, Calif., provides transistor-level circuit simulation of high-complexity integrated circuit designs, including mixed analog and digital designs. ATS™ runs on general purpose computers such as those provided by Sun Microsystems, Inc. and Hewlett-Packard, Inc. running the Solaris™ and HP-UX™ operating systems, respectively.

The various components of an integrated circuit are initially defined by their functional operations and relevant inputs and outputs. The designer may also provide basic organizational information about the placement of components in the circuit. During these design states, the designer generally structures the circuit using considerable hierarchical information, and has typically provided substantial regularity in the design.

From the HDL or other high level description, the actual logic cell implementation is typically determined by logic synthesis, which converts the functional description of the circuit into a specific circuit implementation. The logic cells are then "placed" (i.e., given specific coordinate locations in the circuit layout) and "routed" (i.e., wired or connected together according to the designer's circuit definitions). The placement and routing software routines generally accept as their input a flattened netlist that has been generated by the logic synthesis process.

In particular, the ATS™ product accepts design file formats according to the Simulation Program with Integrated Circuit Emphasis (SPICE) industry standard format, or the Spectre™ format developed by Cadence Design Systems, Inc. Both of these formats provide a user or circuit designer with the ability to specify device-level (i.e., transistor-level) circuit designs.

Further explanation of a particular chip design process is set forth, for example, in U.S. Pat. No. 5,838,583, hereby incorporated by reference as if set forth fully herein.

In particular, a mixed analog/digital simulator according to the general principles discussed above is useful for allowing designers of mixed analog and digital systems, including integrated circuit designs, to model, test, and observe the electrical operating characteristics of a mixed system without having to construct an actual physical prototype of the system. A detailed description of a simulation system suitable for use with an embodiment of the present invention is contained in U.S. Pat. No. 5,812,431, also assigned to Cadence Design Systems, Inc., the common assignee of the present invention, the entire disclosure of which is hereby incorporated by reference into this specification. Further details concerning the translation of user-specified behavioral descriptions for simulation and circuit modeling techniques for simulation are provided in U.S. Pat. Nos. 5,634,115 and 5,335,191, respectively, each of which is also assigned to Cadence Design Systems, Inc., the common assignee of the present invention, the entire disclosures of which are hereby incorporated by reference into this specification.

Figure 1:
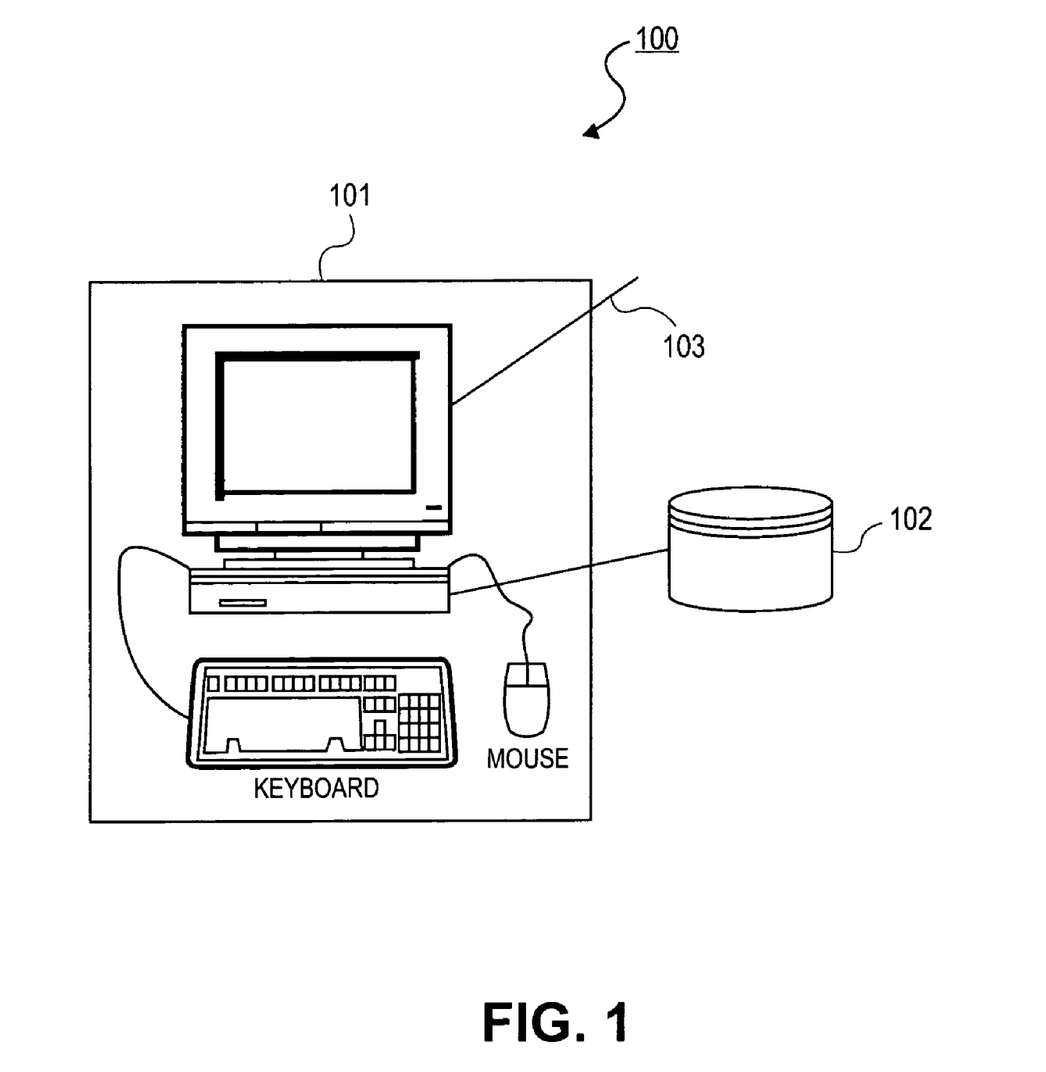
FIG. 1 depicts a preferred embodiment of a mixed analog/digital simulator according to a preferred embodiment.

FIG. 1 depicts a preferred embodiment of a mixed analog/digital simulator 100 according to one embodiment as disclosed herein. In FIG. 1, simulator 100 includes a simulation processor 101 and a storage device 102. Simulation processor 101 includes a computer processing element, memory, operating system, simulation application program, network interface 103, and standard peripherals including a monitor, keyboard, and mouse. Simulation processor 101 interfaces with storage device 102 for the exchange of stored programs and data, such data including information pertaining to one or more mixed analog/digital designs for simulation. In a preferred embodiment, simulation processor 101 is a workstation computer platform such as is commercially available from Sun Microsystems, Inc. or Hewlett Packard, Inc. and storage device 102 is a hard disk or other memory device connected to and compatible with simulation processor 101.

In operation, the mixed analog/digital simulator 100 performs a simulation of an electronic circuit design that may have both digital and analog components. Simulation of interfaces between digital circuit blocks and interfaces between analog circuit blocks is carried out in a conventional manner. For an analog circuit block connected to the output of a digital circuit block, the mixed analog/digital simulator 100 obtains the response of the analog circuit block to a digital input signal (i.e., 0 or 1) by performing a conventional digital-to-analog conversion of the digital input signal and then applying the resulting analog voltage to the corresponding input of the analog block. For unknown (i.e., "X") digital inputs, the simulator 100 performs a similar digital-to-analog conversion for the X input according to user-specified rules for converting the X input, according to techniques known in the art.

The simulator 100 further includes the capability for analog circuit block inputs to accommodate digital signal Z states. Simulator 100 is thereby able to accurately simulate a wide variety of mixed analog/digital designs that otherwise might not be subject to effective simulation.

In the design and operation of electrical circuits, logic Z states arise in several ways. For example, a tri-statable digital logic gate can output a Z value. Furthermore, a user-specified driver, vector, or wave can output a Z value. In each of these cases, the network node (or "net") at which the Z value is presented may fan out to an analog block, and to other digital blocks as well.

Figure 2:
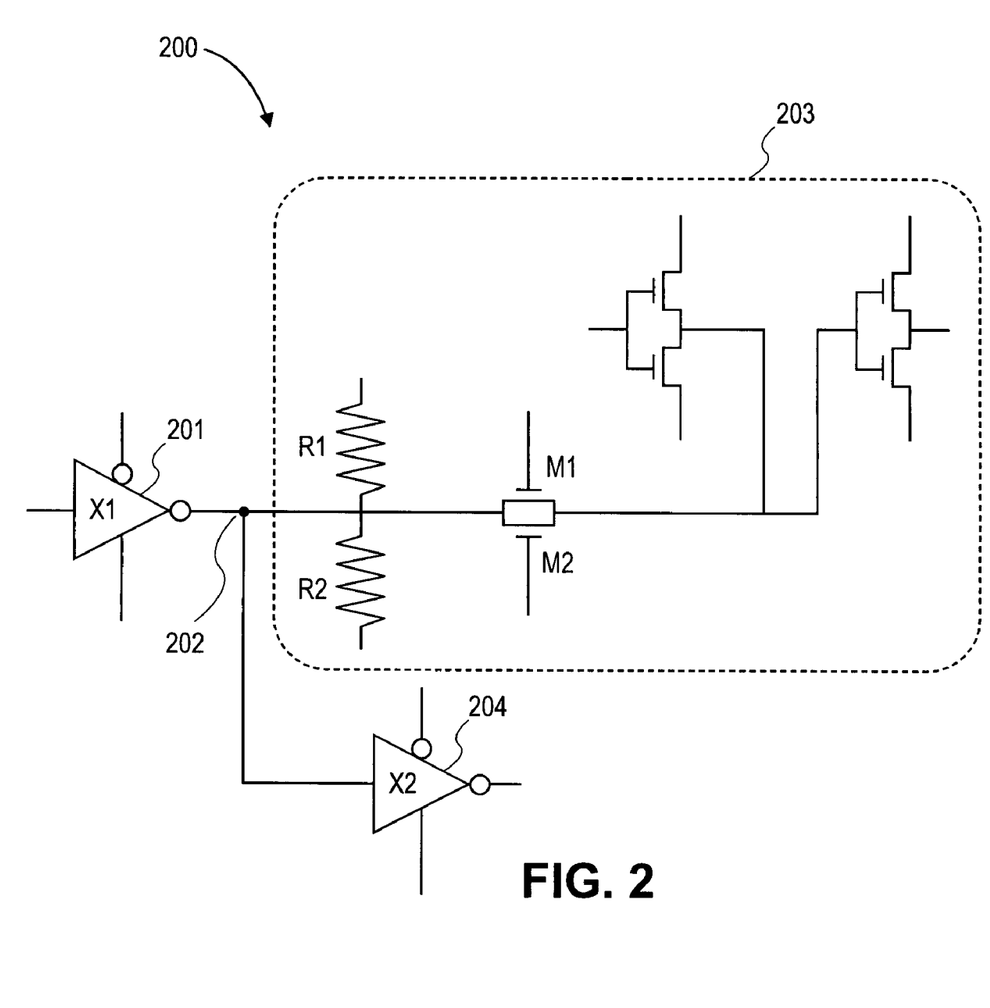
FIG. 2 is a schematic diagram of a simulated circuit in which a digital signal output is driving analog and digital blocks.

FIG. 2 is an example of such a circuit 200 in which a digital signal output is driving both analog circuit blocks and digital circuit blocks. Circuit 200 includes a digital gate 201 (which may be part of a larger digital circuit block) having an output at a node 202 connected as an input to both an analog circuit block 203 and another logic gate 204 (which also may be part of a larger digital circuit block). In operation of the circuit 200 depicted in FIG. 2, when digital gate 201 drives any non-Z value onto network node 202, every fanout of net 202 including analog circuit block 203 connected to net 202 (analog block 203 in this example includes, among other things, components R1/R2 and transistor devices M1/M2) receive this non-Z value as an input. However, when digital gate 201 is not driving an output signal of 0, 1, or X, digital gate 201 presents a Z value (i.e., floating) output onto net 202. In this case, the circuit designer intends for analog circuit block 203 to determine the voltage or signal present at net 202. In this example, the analog circuit block 203 determines the voltage or signal present at net 202 by virtue of the resistor components R1/R2 and transmission gate M1/M2 (if in the "ON" state). The other fanouts of net 202, such as digital logic gate 204, will receive the voltage determined by analog block 203 instead of the Z value presented by gate 201.

In order to provide fidelity with the design being simulated, simulator 100 processes Z-valued inputs to analog blocks as follows: When an analog circuit block receives a Z value (i.e., floating value) on an input (i.e., the input is not being driven), simulator 100 enables the analog circuit block to solve for that node as if it were an output of the analog circuit block. Since this output of the analog block is now the only signal being driven on the network node (i.e., net) to which it is connected, the analog circuit block can propagate its solution to the other fanouts (i.e., device or circuit inputs) of the net. In this manner, an input to an analog block becomes an output when not being driven, but remains an input otherwise. The connection of the analog circuit block to a network node at which the analog circuit block normally receives an input but sometimes drives an output (when the node is otherwise floating) is referred to herein as an analog tri-state "ioput."

A simulator 100 according to the embodiment described with respect to FIG. 2 allows analog circuit block 203 to affect the signal present at net 202 as would occur in the actual circuit implementation, instead of providing a Z value (i.e., floating value) at net 202 as presented by the output of digital gate 201.

In a preferred embodiment, simulator 100 includes a group of programmable instructions that allow a user of simulator 100 to specify the operating parameters of a simulated electrical circuit. In addition to outputs of tri-statable gates, Z states can arise in a simulated electrical circuit in a variety of ways. For example, in an embodiment, Z states can be specified to occur at a particular net 202 of a simulated design using the following exemplary commands: "Connect vector," "set waveform," and "efsig driver." Outputs of digital logic gates and other digital drivers discussed below are assumed to be infinitely strong, zero impedance drivers when they are outputting any non-Z value.

In a preferred embodiment, the "connect vector" command provided by simulator 100 operates in conjunction with a T_Quote vector driver. The T_Quote vector driver permits a vector file stored using storage device 102 to command simulator 100 to either drive a digital value (i.e., 0 or 1) onto net 202, or to sense a digital value from net 202. When driving, the T_Quote vector specifies hard values 0 or 1. When sensing, the T_Quote vector specifies soft values L (low) when expecting to sense 0, and H (high) when expecting to sense 1. When sensing, the T_Quote vector actually drives a Z state onto net 202, and senses the value determined from the digital circuit block excluding its own Z driven output. In this case analog circuit block 203 on net 202 determine the value present at net 202. An example "connect vector" command for simulator 100 using a T_Quote driver (written in a language compatible with the ATS™ software simulation product commercially available from Cadence Design Systems, Inc. of San Jose, Calif.) is:

set vector file=io.vec tagname=t_quote period=4000.0
    connect vector name=t_quote signal=e1 direction=both col=1

In the above example, the "set vector" intermediate command is used to indicate to T_Quote driver ("tagname=t_quote") that the file containing the desired T_Quote vector is file "io.vec" ("file=io.vec"). Next, the "connect vector" command instructs simulator 100 to apply a value as specified by T_Quote driver (per file "io.vec") to the signal designated "e1" in the simulated circuit ("signal=e1"). In this example, the "connect vector" command instructs simulator 100 to provide a bi-directional signal at net 202 ("direction=both"). Each element of the T_Quote vector file is applied for the duration specified in the "set vector" command, nominally expressed in microseconds ("period=4000.0").

An example of an "io.vec" file for use with the above "connect vector" command is:

* vector file;
    T'0'
    T'0'
    T'L'
    T'1'

For the above example "io.vec" file, simulator 100 applies a value as specified in file "io.vec" to the signal designated "e1" in such a way that simulator 100 can both drive and sense signal "e1." In this particular example, simulator 100 drives "0" for two clock periods, then senses the signal expecting a "0" (L) for one clock period, and then drives a "1."

In a preferred embodiment, the "set waveform" command provided by simulator 100 allows a user to specify the occurrence of a Z state as well as "0" and "1" values for a particular signal of a simulated design. In a preferred embodiment, the "set waveform" command causes simulator 100 to apply a value of "1" in response to a set waveform instruction specifying the letter "u" (up), and to apply "0" in response to the letter "d" (down). The "Z" state is specified by the letter "z."

An example "set waveform" command (again represented in an ATS™ compatible language) for simulator 100 is:

set waveform name=3 definition=(z10>(u60 z60 d60 z60))
    apply waveform name=3 signal=IN The above example commands specify a waveform "3" ("name=3") to be applied by simulator 100 ("apply waveform name=3") to signal "IN" of a simulated design ("signal=IN"), the waveform beginning in the Z state for 10 time units and then repeating a 1-Z-0-Z pattern for 60 units each.

In a preferred embodiment, the "efsig driver" command provided by simulator 100 also allows a user to specify digital values for a signal in a simulated design, including Z state values. An example "efsig driver" command for simulator 100 is:

connect driver name=input_sig func=Efsig powerup=Efsig_pup sig=IN The above example "efsig driver" command specifies a set of values to be applied by simulator 100 to a signal of a simulated design ("sig=IN"), the set of values provided as a sequential series of instructions occurring in a file "input_sig."

An example of an "input_sig" file for use with the above "efsig driver" command is:

```
% SIG 1
0 SIG 0
10 SIG 1
20 SIG z
30 SIG 0
40 SIG 1
50 SIG u
60 SIG 0
70 SIG z
```

For the above example "input_sig" file, simulator 100 applies a value, including Z, as specified in file "input_sig" to the signal designated "IN" in the indicated sequence.

In a preferred embodiment, simulator 100 provides an analog tri-state "ioput" as follows. Simulator 100 determines a condition in which a design to be simulated contains one or more analog circuit blocks (such as analog circuit block 203) that can potentially drive a value back onto one of its inputs. If such a condition exists, as in the case of FIG. 2, simulator 100 transforms that input of analog circuit block 203 into an input-output pair, called an "ioput" pair. When the input signal to analog block 203 is a non-Z value, the ioput pair acts as a pure input, and the output portion of the ioput presents the value Z to isolate analog circuit block 203 from affecting other fanouts of the input signal. Simulator 100 then solves the associated values for analog circuit block 203 using the value of the non-Z input signal.

When the input signal to analog circuit block 203 is a Z value, however, then such an input to analog circuit block 203 is not being driven by another device or circuit (such as digital gate 201). In this case, simulator 100 solves for the analog circuit block 203 absent the input to analog block 203 and propagates the analog block solution (i.e., signal value) to other fanouts of net 202 using the output portion of the analog ioput. Each of the other fanouts of net 202 will thereby see the value driven by the analog ioput rather than the value of the Z state. In this manner, the voltage or signal present at the analog ioput affects the rest of the circuit only when it is not otherwise driven.

It is commonplace in digital designs to connect several tri-statable outputs together. In general, only one of these connected outputs will be driving (i.e., outputting a non-Z value) at any given time, the other outputs being in their high-impedance state (i.e., outputting a Z value). In the event that more than one digital driver is driving, and the driven values are not the same non-Z values, then a bus contention condition arises. When bus contention occurs, simulator 100 generally attempts to resolve the contending multiple digital values and propagate the final resolved value to the fanouts of the multi-sourced net 202. These fanouts may include the drivers themselves (if they are biputs rather than pure outputs) which expect to see the digital contribution of all of the other drivers excluding themselves.

Figure 3:
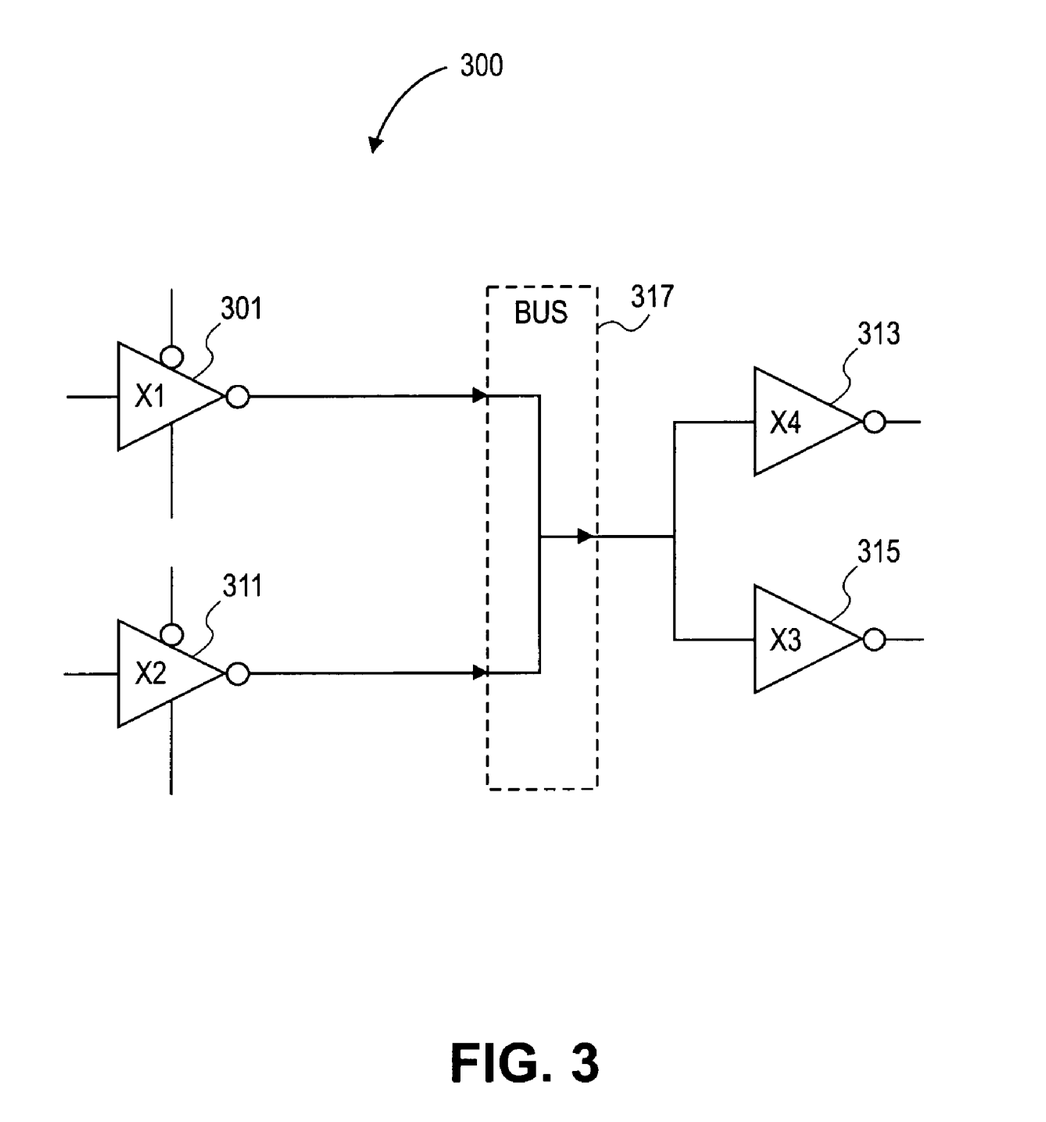
FIG. 3 is a schematic diagram of a simulated circuit having a bus element electrically coupling multiple digital outputs to a single network node.

In a preferred embodiment, simulator 100 provides a special bus element that provides a bus resolution function. FIG. 3 depicts an embodiment of a digital bus element 217 as may be provided by simulator 100 for purposes of illustrating bus contention. Bus contention as described above can occur on bus 317 between the output of digital gate 301 and the output of digital gate 311. The outputs of digital gates 301 and 311 are connected in common to the inputs of digital gates 313 and 315 by bus 317. In the case of bus contention, simulator 100 resolves the contending signals into a single signal solution and propagates the resolved solution to the inputs of digital gates 313 and 315 using bus 317.

Figure 4:
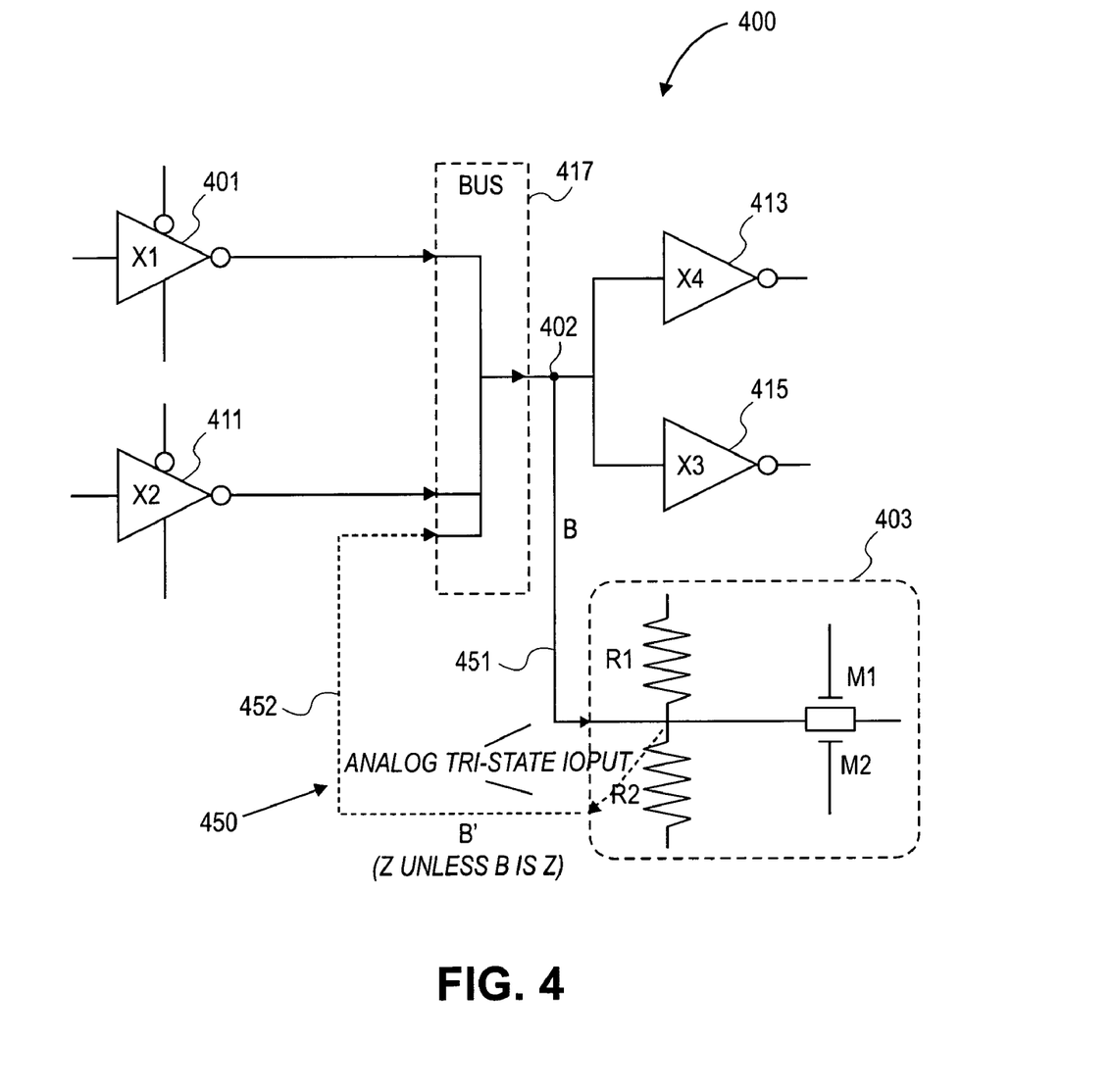
FIG. 4 is a schematic diagram of a simulated circuit having a bus element electrically coupling multiple digital outputs to a single network node connected to an analog block and digital gates.

FIG. 4 depicts an analog/digital bus element 417 provided by simulator 100 in the context of a circuit design 400 including an analog circuit block 403 connected to bus element 417. Referring now to FIG. 4, when one of the fanouts of a driven digital net 402 is an analog block 403 which can potentially also be a driver of net 402, simulator 100 preferably provides the analog input in the form of an analog tri-statable ioput 450. Ioput 450 drives a non-Z value using an output portion 452 only if all of the other digital drivers (e.g., outputs of digital gates 401 and 411) are in their high impedance state (i.e., are driving a Z value). If one or more digital drivers (e.g., outputs of digital gates 401 and 411) are driving a non-Z signal, then ioput 450 receives the output (or resolved) non-Z signal using an input portion 451.

In the case in which ioput 450 is driving a non-Z value using an output portion 452, bus 417 propagates the analog value received from analog tri-state ioput 450 to its fanout gates 413 and 415. Each digital fanout gate (e.g., 413 and 415) inputs will receive the digital logic value of the ioput output 452, and any analog inputs will receive the proper analog value of the ioput 450. For example, if fanout gate 415 were an analog block, it would receive the voltage solved for on net B' (output portion 452) rather than a digital value.

In a preferred embodiment, simulator 100 processes changes in state for the signals of a design being simulated by evaluating, or solving for, the signal states present at various points in the design over discrete units of time. Each such discrete unit of time may be referred to as a "time tick."

Referring once again to FIG. 4, when a digital signal changes from a non-Z value to Z, analog circuit block 403 receives the effect of the newly-presented Z signal after one time tick due to rollback. Rollback describes a situation in which an assumed future signal value solved for by simulator 100, such as the value for an analog circuit block 403, must be reevaluated when an input to the circuit or circuit block changes. The new signal value is determined in the time tick following the time tick in which the new input value is presented. Rollback occurs in response to any digital signal making a state transition. Simulator 100 will then solve for the circuit block using the new input state and post a new event after one time-tick.

Thus when analog circuit block 403 is presented with a Z value at its input, simulator 100 solves for analog block 403 as if no current is flowing though that (undriven) input. The new solved value is posted to the ioput output portion 452 and propagated to the other fanout groups 413 and 415 using bus 417. Downstream fanout groups 413 and 415 will be subsequently reevaluated with the new input value presented by output portion 452 of ioput 450.

In a preferred embodiment, simulator 100 provides a circuit partitioning capability in which, for example, a user can specify that inputs within certain circuit blocks are not to have their inputs transformed into ioputs 250. Simulator 100 treats such specified blocks as having "pure" inputs and outputs. Inputs to such groups can, however, become fanouts of other analog tri-state ioputs 250. In a preferred embodiment, each such partitioned group is solved for separately by simulator 100.

Thus, a method and apparatus for simulating mixed analog/digital systems has been shown that transforms the input of an analog circuit block into an analog tri-statable ioput capable of driving an analog signal when the digital gate outputs connected to the analog block input are presented in a high-impedance Z state.

While the above description contains many specific details of the preferred embodiments of the present invention, these should not be construed as limitations on the scope of the invention, but rather are presented in the way of exemplification. Other variations are possible. Accordingly, the scope of the present invention should be determined not by the embodiments illustrated above, but by the appended claims and their legal equivalents.

What is claimed is:

1. A circuit design simulator, comprising:
   a stored electronic representation of a circuit design, said circuit design including at least one interface between a digital circuit and an analog circuit, said interface comprising a node at which said digital circuit provides a digital circuit output and at which said analog circuit receives an input and provides either an output or no output, said digital circuit output taking on any one of several states including a digital high state, digital low state, or a high impedance state;
   at least one processor for simulating operation of said circuit design, said at least one processor dynamically determining whether to apply said output or said no output to said node according to said digital circuit output state; and
   a storage device configured for storing a result of the simulating operation of said circuit design.

2. The circuit design simulator of claim 1, wherein said at least one processor applies said output to said node when said digital circuit output is in said high impedance state, and applies said no output to said node when said digital circuit output is in said digital high state or said digital low state.

3. A method for simulating electronic activity at an analog/digital interface in a circuit design, said method comprising:
   identifying an interface between a digital circuit and an analog circuit, said interface comprising a node at which said digital circuit provides an output and at which said analog circuit receives an input, said output taking on any one of several states including a digital high state, digital low state, or a high impedance state;
   displaying the output on a display apparatus or storing the output in a computer storage device;
   using a processor, simulating the circuit design by modeling said output as a digital output signal from said digital circuit to said node when said output is not in said high impedance state, and as an analog output signal from said analog circuit to said node when said output is in said high impedance state;
   dynamically switching between said digital output signal and said analog output signal based upon whether or not said output is in said high impedance state; and
   displaying a result of the act of simulating the circuit design or storing the result in the computer storage device or in a second computer storage device.

4. The method of claim 3, wherein attributes of said analog output signal are solved for while assuming that no current flows from said digital circuit to said node when said output is in said high impedance state.

5. The method of claim 3, further comprising:
   providing the input received by the analog circuit in the form of an analog tri-statable ioput, wherein the analog tri-statable ioput drives a non-Z value using all output portion, and all other digital drivers are driving a Z value.

6. The method of claim 5, further comprising:
   receiving, as the ioput, an output non-Z signal using an input portion, wherein one or more of the all other digital drivers are driving a non-Z signal using the output portion.

7. A method for simulating an electronic activity at an analog/digital interface in a circuit design, said method comprising:
   identifying an interface between a plurality of digital circuits and an analog circuit, said interface comprising a node at which each of said plurality of digital circuits provides an output and at which said analog circuit receives an input, each said output taking on any one of several states including a digital high state, digital low state, or a high impedance state;
   displaying the output on a display apparatus or storing the output in a computer storage device;
   using a processor, simulating the circuit design by modeling at least one of said output as a digital output signal from a corresponding digital circuit to said node when said at least one of said output is not in said high impedance state, and as an analog output signal from said analog circuit to said node when said output provided by each of said plurality of digital circuits is in said high impedance state;
   dynamically switching between said digital output signal and said analog output signal based upon whether or not said output provided by each of said plurality of digital circuits is in said high impedance state; and
   displaying a result of the act of simulating the circuit design or storing the result in the computer storage device or in a second computer storage device.

8. The method of claim 7, wherein attributes of said analog output signal are solved for while assuming that no current flows from said plurality of digital circuits to said node when said output provided by each of said plurality of digital circuits is in said high impedance state.

9. The method of claim 7, wherein each said output from said plurality of digital circuits are connected to a bus contention element, said method further comprising collectively resolving each said output from said plurality of digital circuits into a single output signal, said single output signal taking on any one of several states including said digital high state, said digital low state, or said high impedance state.

10. A method for simulating electrical operation at an analog/digital interface in a circuit design, said method comprising:
    identifying an interface between a digital circuit and an analog circuit, said interface comprising a node at which said digital circuit either outputs a digital signal or else presents a high impedance output so as to be effectively isolated from said node, and at which said analog circuit receives an input signal at an input port;
    adding a conditional output signal from said input port of said analog circuit to said node, wherein either an output signal or no output signal is applied from said analog circuit to said node;
    using a processor, simulating electrical operation at said interface by applying said output signal from said analog circuit to said node when said digital circuit presents a high impedance output, and applying said no output signal from said analog circuit to said node when said digital circuit presents a digital signal; and
    storing simulation information in a computer storage device.

11. A computer-readable medium on which is embodied a set of programmed instructions which, when executed by one or more processors, cause the one or more processors to execute a process for simulating a circuit design of electronic circuits, the process comprising:
    identifying an interface between one or more digital circuits and an analog circuit, said interface comprising a node at which each of said one or more digital circuits provides an output and at which said analog circuit receives an input, each said output taking on any one of several states including a digital high state, digital low state, or a high impedance state;

displaying the output on a display apparatus or storing the output in a computer storage device;

using the one or more processors, simulating the circuit design by modeling at least one of said output provided by said one or more digital circuits as a digital output signal from a corresponding digital circuit to said node when said at least one of said output is not in said high impedance state, and as an analog output signal from said analog circuit to said node when said output provided by each of said one or more digital circuits is in said high impedance state;

dynamically switching between said digital output signal and said analog output signal based upon whether or not said output provided by each of said one or more digital circuits is in said high impedance state; and displaying a result of the act of simulating the circuit design on a display apparatus or storing the result in a computer readable storage device or in a second computer readable storage device.

12. The computer-readable medium of claim 11, wherein said programmed instructions further cause said one or more processors to perform the act of dynamically switching between said digital output signal and said analog output signal based at least in part upon whether or not said output provided by each of said one or more digital circuits is in said high impedance state.

13. The computer-readable medium of claim 12, wherein said programmed instructions further cause said one or more processors to solve for attributes of said analog output signal while assuming that no current flows from said one or more digital circuits to said node when said output provided by each of said one or more digital circuits is in said high impedance state.

14. The computer-readable medium of claim 12, wherein said one or more digital circuits comprise a plurality of circuits, and each said output from said plurality of circuits is connected to a bus contention element, said programming instructions causing said one or more processors to further perform the act of collectively resolving each said output into a single output signal, said single output signal taking on any one of several states including said digital high state, said digital low state, or said high impedance state.

15. A computer implemented method for simulating a circuit design, comprising:

identifying an interface between a plurality of digital circuit outputs and an analog circuit input, wherein each of said plurality of digital circuit outputs can present a high impedance state;

modeling said interface by using a processor to add an output from an analog circuit receiving said analog circuit input to said interface;

displaying the output on a display apparatus or storing the output in a computer storage device;

using the processor, simulating electrical operation at said modeled interface by resolving an electrical state of said interface using only the output from the analog circuit when all of said plurality of digital circuit outputs are in a high impedance state, and resolving the electrical state of said interface using one or more of said plurality of digital circuit outputs otherwise; and displaying a result of the act of simulating the circuit design on the display apparatus or storing the result in the computer storage device or in a second computer storage device.

16. A mixed analog/digital simulator comprising:

a simulation processor;

said simulation processor including a computer-readable medium on which is embodied a set of programmed instructions that cause said simulation processor to simulate an operation of a design circuit, wherein said design circuit includes:

(1) a digital circuit having an output;

(2) a network electrically coupled to said digital circuit output, said network formed by electrically coupling an input of each of a plurality of circuit blocks at a network input node;

(3) said circuit blocks including at least one analog circuit having an analog circuit input electrically coupled to said network input node;

(4) said analog circuit having an input mode of operation for receiving an input signal at said analog circuit input and an output mode of operation for producing an output signal at said analog circuit input;

(5) said digital circuit output being applied to said network input node when said digital circuit is in a non-high-impedance state; and (6) said output signal of said analog circuit being applied to said network input node when said digital circuit is in a high-impedance state; and a tangible computer accessible medium or a storage device configured for storing a result of simulating an operation of a design circuit by the simulation processor or a display apparatus configured for displaying the result.

17. The simulator of claim 16, wherein said output signal of said analog circuit is operably coupled to a plurality of digital circuit outputs using a bus.

18. The simulator of claim 16, wherein said input mode and output mode are selected automatically and dynamically according to a state of said digital circuit.

19. A method of simulating a mixed analog/digital system, comprising:

transforming an input of an analog circuit into an ioput, said ioput having a conditional output feeding back to a bus, said ioput being operable under a high-impedance input state, and said ioput capable of accepting a digital signal input and producing an analog signal output;

displaying said digital signal input, said analog signal output, or said ioput on a display apparatus or storing said digital signal input, said analog signal output, or said ioput in a computer storage device;

electrically coupling said ioput to a digital circuit output and to inputs of a plurality of additional circuits;

receiving said digital signal input at said ioput when said digital circuit output is in a non-high-impedance state;

applying said analog signal output at said ioput when said digital circuit output is in a high-impedance state; and using a processor, simulating the mixed analog/digital system by solving the mixed analog/digital system for simulation information based upon at least a result of the act of receiving said digital signal input or the act of applying said analog signal output and storing the simulation information in the computer storage device or in a second computer storage device.

20. The method of claim 19, wherein said act of electrically coupling comprises coupling said ioput to a plurality of digital circuit outputs using a bus.

* * * * *